United States Patent
Wolf et al.

(10) Patent No.: US 11,124,616 B2
(45) Date of Patent: Sep. 21, 2021

(54) SHEETLIKE SEMIFINISHED PRODUCT HAVING A PLASTIC MATRIX

(71) Applicant: NOLAX AG, Sempach Station (CH)

(72) Inventors: Thomas Wolf, Neudorf (CH); Claude Hosotte, Michelbach le Haut (FR); Philipp Frei, Kaltbach (CH); Raphael Schaller, Zürich (CH); Beat Bruderer, Zürich (CH)

(73) Assignee: NOLAX AG, Sempach Station (CH)

( * ) Notice: Subject to any disclaimer, the term of this patent is extended or adjusted under 35 U.S.C. 154(b) by 0 days.

(21) Appl. No.: 16/623,846

(22) PCT Filed: Jun. 21, 2018

(86) PCT No.: PCT/EP2018/066509
§ 371 (c)(1),
(2) Date: Dec. 18, 2019

(87) PCT Pub. No.: WO2018/234423
PCT Pub. Date: Dec. 27, 2018

(65) Prior Publication Data
US 2020/0131323 A1    Apr. 30, 2020

(30) Foreign Application Priority Data
Jun. 21, 2017  (EP) .................................. 17177153

(51) Int. Cl.
*C08J 5/24* (2006.01)
*C08L 75/04* (2006.01)

(52) U.S. Cl.
CPC ................. *C08J 5/24* (2013.01); *C08L 75/04* (2013.01); *C08J 2375/04* (2013.01); *C08J 2423/06* (2013.01); *C08L 2205/16* (2013.01)

(58) Field of Classification Search
CPC ... C08K 7/02; C08K 7/04; C08K 7/06; C08K 7/08; C08K 7/10; C08K 7/12; C08K 7/14
See application file for complete search history.

(56) References Cited

U.S. PATENT DOCUMENTS

| | | | |
|---|---|---|---|
| 6,593,435 B2 | 7/2003 | Abend | |
| 9,399,705 B2 | 7/2016 | Hupka et al. | |
| 2003/0119976 A1 | 6/2003 | Ganster et al. | |
| 2008/0090921 A1 | 4/2008 | Hayes et al. | |
| 2013/0045652 A1* | 2/2013 | Schmidt | C08G 18/42 442/169 |
| 2018/0155515 A1* | 6/2018 | Spyrou | C08G 18/1875 |

FOREIGN PATENT DOCUMENTS

| | | |
|---|---|---|
| EP | 2 670 795 B1 | 7/2018 |
| WO | 99/29755 A1 | 6/1999 |
| WO | 03/016374 A1 | 2/2003 |
| WO | 2013/139704 A1 | 9/2013 |
| WO | 2015/097097 A1 | 7/2015 |
| WO | 2016/205254 A1 | 12/2016 |
| WO | 2016/205255 A1 | 12/2016 |

OTHER PUBLICATIONS

F. C. Campbell, "Manufacturing Process for Advanced Composites", 2004, pp. 1-37, available online at https://doi.org/10.1016/B978-185617415-2/50002-2.*
European Search Report Corresponding to 17177153.8 dated Oct. 27, 2017.
International Search Report Corresponding to PCT/EP2018/066509 dated Oct. 1, 2018.
Written Opinion Corresponding to PCT/EP2018/066509 dated Oct. 1, 2018.

* cited by examiner

*Primary Examiner* — Vu A Nguyen
(74) *Attorney, Agent, or Firm* — Finch and Maloney, PLLC; Michael J. Bujold; Jay Franklin

(57) ABSTRACT

A sheetlike semifinished product comprising a matrix having at least one latent reactive plastics composition which is curable to afford an elastomer, in particular a thermoplastic elastomer, and fibers embedded in the matrix. A process for producing sheetlike semifinished products is further disclosed.

14 Claims, No Drawings

SHEETLIKE SEMIFINISHED PRODUCT HAVING A PLASTIC MATRIX

The invention relates to a sheet-like semifinished product, a process for producing sheet-like semifinished products and also the use of a sheet-like semifinished product as per the preambles of the independent claims.

Fiber-reinforced plastics are gaining increasing importance for the production of structural components. Such components are suitable, in particular, for use in the construction of motor racing vehicles, space flight vehicles, rail vehicles and aircraft. For example, these components have, for the same performance, a lower weight than conventional components made of steel, aluminum or wood, which leads to savings in energy and fuel consumption.

Fiber-reinforced plastics can be produced, for example, by embedding fibers in a polymer matrix and subsequently curing the latter. Thermoset resin systems dominate as polymer matrix. As an alternative, the fibers and the resin can be combined with suitable hardeners and stored in an uncured state. Crosslinking to form a fiber-reinforced plastic then occurs only at a later point in time. Typically, epoxy resins are used as resins. However, due to the presence of hardeners and accelerators in the resin matrix, these are storage-stable for only a limited time. In order to avoid premature crosslinking, such reactive systems are stored at low temperatures (about −20° C.) and have to be thawed before further processing.

WO 2015/097097 A1 describes a storage-stable prepreg based on an epoxy resin which cures by means of a crosslinker to form a thermoset. The storage stability is achieved here by physical separation of reactive resin and crosslinker after drying.

Mixing of the components can then be brought about by increasing the temperature so that all compounds are present in molten form. However, these latently reactive epoxy resins result in comparatively long pressing times at comparatively high temperatures in the processing of the prepregs. Longer pressing times and higher process temperatures would also have an influence on the fiber types which can be used. Low-melting fiber types, for example polyamide, polyethylene or polyester, cannot be used. In addition, only curing to give thermosets is possible. However, thermosets have the disadvantage that they lead to fractures and cracks in the material under high and instantaneous mechanical stress and thus to weakening of the material.

WO 99/29755 describes a process for producing storage-stable, latently reactive layers and powders of surface-deactivated, solid polyisocyanates and dispersions or aqueous solutions of isocyanate-reactive polymers, which can be used as adhesives and coatings.

WO 2013/139704 discloses storage-stable prepregs (pre-impregnated fibers) based on low-viscosity polyurethane systems and flat fiber composite components produced therefrom (moldings, composite components) which are obtained by means of an impregnation process for fiber-reinforced materials such as woven fabrics and nonwoven.

Latently reactive polymer compositions based on isocyanate and/or polyurethane are also disclosed in WO 03/016374, WO 2016/205254 and WO 2016/205255.

However, the prior art lacks sheet-like semifinished products which can be stored for a long time and have high stiffness and strength values as can be ensured by, for example, the use of continuous fibers.

It is therefore an object of the invention to overcome the disadvantages of the prior art. In particular, it is an object of the invention to provide a sheet-like semifinished product which displays shortened process times for curing and also is resistant to high and instantaneous mechanical force after curing. The semifinished product should be storage-stable over a relatively long time. It is also an object of the invention to provide a process for producing such a sheet-like semifinished product and also a use of such a product.

This object is achieved by the apparatus, process and use defined in the independent claims. Further embodiments can be derived from the dependent claims.

The invention provides a sheet-like semifinished product comprising a matrix comprising at least one latently reactive polymer composition comprising polyurethane and a latently reactive, in particular encapsulated, surface-deactivated or blocked, isocyanate, which polymer composition can be cured to give an elastomer, in particular a thermoplastic elastomer;

continuous fibers embedded in the matrix, with the fibers preferably being oriented unidirectionally.

Here "embedding" is to be interpreted as a macroscopic view, i.e. a view from the outside. "Embedding" means, in particular, impregnation. The fibers are enveloped by the matrix. Envelopment can, for example, be effected by spraying with the matrix or by pulling the fibers through a matrix solution.

The semifinished product of the invention has the advantage that the fibers are completely impregnated, i.e. surrounded by the polymer matrix. Before further processing (i.e. shaping and curing), the semifinished product can be stored at room temperature for a long period of time.

Furthermore, the semifinished product of the invention is suitable for producing fiber composite components having a high resistance to mechanical force.

The resistance to mechanical force results from the use of continuous fibers. Such fibers increase the stiffness and strength of the composite.

For the purposes of the present patent application, continuous fibers are all fibers having a length of 50 mm.

The fibers are preferably oriented unidirectionally. Here, "unidirectional" means that the longitudinal axes of the individual fibers run essentially parallel. For the purposes of the present invention, "running essentially parallel" means that the longitudinal axes of the fibers do not have any angles between one another of more than ±25°. The angles between the longitudinal axes of the fibers are preferably less than ±10°.

Unidirectional semifinished products have the advantage that they can be placed in layers in a targeted manner along the direction of the force. When a plurality of sheet-like semifinished products having in each case unidirectionally oriented fibers are placed on top of one another in a rotated manner, particularly good resistance to mechanical forces from various sides is obtained.

The fibers can be based on protein, cellulose, synthetic polymers or inorganic substances.

Protein-based fibers can be selected from the group consisting of: wool, silk, angora, cashmere, casein, collagen, ardein and zein.

Cellulose fibers can be cotton and bast fibers such as cotton, linen, hemp or jute. Cellulose fibers can also be wood-based, for example viscose, Modal, Lyocell, Cupro, acetate.

Fibers composed of synthetic polymers can be selected from the group consisting of: polyethylene, polyester; polyamide; aramid; polypropylene; polyurethane (Elastan); acrylic; polytetrafluoroethylene; polyphenylene-2,6-benzobisoxazole; liquid crystal polymers (LCP), in particular poly(p-hydroxybenzoic acid-co-hydroxy-6-naphthoic acid).

The group of fibers composed of inorganic substances encompasses carbon, ceramic, glass, silica, metal.

The fibers can be embedded as individual fibers in the matrix or else can have been spun beforehand to give a thread and embedded as thread. Likewise, the fibers can have been processed to give threads and then to give a woven fabric, with the woven fabric being embedded. Filaments can also be embedded. Here, filaments are synthetic fibers of any length. It is also conceivable for a combination of different fibers to be embedded.

The possibility of using various types of fibers has the advantage that a wide field of application is opened up. The properties of the product can be optimally matched to the intended use.

The polymer composition comprises a polyurethane and a latently reactive isocyanate. The isocyanate is preferably encapsulated or surface-deactivated or blocked. A radiation-crosslinkable isocyanate would also be conceivable. The ratios of the amounts of polyurethane and isocyanate can vary. For example, the following compositions are conceivable for surface-deactivated isocyanates: for 100 parts by weight (pbw) of polyurethane, it is possible to add from 5 to 10 pbw of tolylene 2,4-diisocyanate dimer (TDI dimer). It is also possible to add 15 pbw of isophorone diisocyanate trimer (IPDI trimer) to 100 pbw of polyurethane in order to prevent yellowing of the material. It is also possible to use a blocked isocyanate. For example, from 2 to 15 pbw of (dimethylpyrazole)-blocked hexamethylene 4,6-diisocyanate (HDI) trimer can be added to 100 pbw of polyurethane.

The latently reactive isocyanate results in no reaction between the isocyanate and the free OH groups of the polyurethane occurring at room temperature. The sheet-like semifinished product can be stored without difficulty for a long period of time at room temperature. The reaction process, i.e. the reaction with a surface-deactivated isocyanate, can be brought about by brief initiation of the reactions at low temperatures (<120° C.). However, it is possible to use blocked isocyanates which are activatable only at higher temperatures, for example at temperatures above 120°. The shaping operation (e.g. pressing, vacuum bag process or in an autoclave) can nevertheless be kept short. It is possible to use short cycle times, which has a positive influence on the fibers which can be used. Thus, the use of low-melting fiber types, for example polyamide, polyethylene or polyester, is also possible.

The polymer composition is preferably present as aqueous dispersion. The polymer composition can also be present as powder or melt. The application of the dispersion can, for example, be carried out by spraying, doctor blade coating, impregnation, infusion and/or vacuum infusion. However, the fibers can also be pulled through the dispersion solution and spread in the process.

The dispersion promotes fiber spreading. In this way, the degree of wetting can be increased, which leads to optimal fiber incorporation and a high proportion of fibers in the matrix.

The polymer composition is substantially free of VOC (volatile organic compounds). This improves occupational hygiene in handling the polymer composition.

It has surprisingly been found that a cloth-like feel can be achieved from spread fibers impregnated with the latently reactive polymer composition by means of the vacuum bag process.

The semifinished product or the end product after curing, i.e. the fiber composite component, can be given further properties by addition of further functional additives, e.g. flame retardants, antimicrobial agents, bonding agents, e.g. to increase the affinity to metals or to increase the affinity to rubber or similar materials, fluorescence agents or UV protectors.

The fibers are arranged substantially in a longitudinal direction relative to a main area of the semifinished product.

Unidirectional semifinished products have the advantage that they can be placed on top of one another in a targeted manner along the direction of force. After further processing (pressing, curing), a robust and resistant fiber composite component can thus be obtained.

The fibers of the sheet-like semifinished product are preferably spread.

Spread fibers can be wetted more readily, and fiber incorporation and thus the proportion of fibers are increased. A higher proportion of fibers improves the performance of the fiber composite component.

Fiber spreading also makes it possible to use different types of fibers in a semifinished product. The use of different polymer compositions in a semifinished product is also conceivable. As a result, various properties can be combined in the material. A further aspect of the invention concerns a process for producing sheet-like semifinished products comprising a matrix, in particular a matrix as described above. The process encompasses the step of embedding fibers in a matrix. The matrix comprises at least one latently reactive polymer composition which can be cured to give an elastomer, in particular a thermoplastic elastomer.

The semifinished product produced in this way can be stored over a long period of time at room temperature. In particular, the use of latently reactive, encapsulated, surface-deactivated or blocked isocyanate makes it possible for activation to be triggered only at high temperatures. This is in contrast to two-component systems whose reactivity depends on the state of activation of a catalyst. Such systems are typically reactive even at temperatures below 100° C. and only short-term storage stability can be achieved therewith.

The latently reactive polymer composition can be cured at temperatures in the range from 60 to 180° C., preferably from 100 to 140° C.

Curing can be carried out after shaping. For this purpose, the semifinished product is optionally cut to size and introduced into a molding tool, for example a press. During the shaping operation, curing can occur at the same time.

The reactivation temperatures can be low compared to conventional processes and thus also make it possible to use low-melting types of fibers.

The fiber composite component can subsequently be taken from the molding tool and if necessary subjected to after-working.

The fibers can be based on protein, cellulose, synthetic polymers or inorganic substances, as comprehensively described above. A combination of various fibers in a semifinished product is also conceivable.

The properties of the semifinished product and also of the fiber composite component can be controlled by the choice of the fibers.

The polymer composition preferably comprises polyurethane and a latently reactive isocyanate. The isocyanate can be encapsulated, surface-deactivated or blocked.

Latently reactive isocyanates remain unreactive over a long period of time at room temperature. As a result, semifinished products produced in such a way can be stored for months and without difficulty before further processing.

Reactivation can be effected at relatively low temperatures compared to conventional processes. Process times and energy input can be reduced.

Curing of such a polymer composition results in an elastomer, in particular a thermoplastic elastomer, having soft and hard segments. The resulting fiber composite component displays high final properties, for example in respect of cohesion, tensile strength, toughness, fatigue, aging. The component is substantially stress-free compared to other fiber composites.

The polymer composition is preferably an aqueous dispersion. However, powders and melts are also possible.

The dispersion allows complete impregnation of the fibers. Drying of the semifinished product before storage liberates essentially no environment-polluting solvents.

The fibers are arranged substantially longitudinally relative to a main area of the semifinished product.

Unidirectional semifinished products can be placed in layers on top of one another along the direction of force, as a result of which good mechanical properties can be achieved.

The fibers are preferably spread. Spreading is carried out, in particular, during embedding.

It is possible to spread different fibers next to one another and thus combine the properties of the different fibers in one semifinished product. This additionally increases the ability to obtain various fiber composite materials.

In addition, an increased degree of wetting of the fibers is achieved by means of the spreading. The incorporation of the fibers is optimized. It is also possible for individual fibers to be enveloped with different polymer compositions. This allows further properties to be combined in the semifinished product.

In principle, unidirectional semifinished products having a thickness in the range from 1 to 100 preferably from 15 to 80 μm and very particularly preferably from 20 to 50 can be produced by the process described. Such semifinished products can, for example, be used for the production of vehicles and vehicle parts, for toys and sports articles or tools in which a low weight and/or handy extension are valued.

However, the invention also provides a process by means of which semifinished products having a thickness in the range from 100 μm to 1 mm, preferably from 150 μm to 700 μm, very particularly preferably from 300 μm to 500 μm, can be produced. Such semifinished products can be used for the production of components which are to have high stability and robustness. The unidirectional semifinished products can have a proportion by volume of fibers in the range from 1 to 99%, preferably from 40 to 80% and very particularly preferably from 55 to 65%.

A further aspect of the invention concerns a sheet-like semifinished product, in particular one which is able to be produced or has been produced as described above.

The sheet-like semifinished product can consist of the same type of fibers embedded in a polymer matrix, different fibers embedded in a polymer matrix, the same type of fibers embedded in different polymer matrices or different fibers embedded in different polymer matrices.

The semifinished product can be adapted in terms of its properties according to its use. Such semifinished products are suitable for producing a variety of fiber composite components. The components display a high resistance and longevity.

A further aspect of the invention concerns the use of a sheet-like semifinished product as described above for the production of protective equipment, vehicle components, sports and leisure articles, tools, cases, machine components, clothing and jewelry.

Protective equipment can be, for example, equipment to protect against heat of emergency services such as fire departments or else military clothing and military equipment.

The semifinished products of the invention are suitable for vehicle components in aerospace and also automobile construction, rail vehicles or ships. For example, the semifinished products can be utilized for the production of tires, hoses, clothing and bodywork parts or as vehicle armoring. The sheet-like semifinished products comprising the polymer matrix can, for example, be used further for textiles such as sails.

Sports and leisure articles encompass, for example, helmets, tennis rackets, safety belts, straps for snap hooks for climbing, ice hockey sticks, skis, shoes, ski boots, bicycle frames, tents, stand-up paddles, boards.

Further conceivable articles are tool handles, grinding belts, conveyor belts and drive belts, toothed and drive straps, tensile elements on a crane, ropes, travel cases, bags, jewelry made of, for example, a multilayer composite of gold-carbon fibers, clocks, shoes.

Two embodiments of the invention are illustrated by way of example below.

EXAMPLE 1

Composition of the Dispersion:

Dispercoll® U XP 2702 (from Covestro AG) is an aqueous, anionic dispersion of aliphatic polyurethane. Combining with an aqueous suspension of a deactivated solid isocyanate, Desmodur® LP BUEJ 471 (an IPDI trimer from Covestro AG), gives a latently reactive system having a content of polyurethane and isocyanate of about 60% and water of about 40%.

Fiber spreading to give the sheet-like semifinished product:

The high-performance fibers are spread and impregnated using this dispersion, so that unidirectional high-performance tapes are formed after drying at 45° C. The matrix material in which the fibers are embedded is at this point in time still latently reactive. High-strength and high-stiffness polyethylene fibers, for example Dyneema SK75 1760 dtex, are spread and impregnated at 5 m/min. One layer of this sheet-like semifinished product has, after drying, a mass loading of about 15 g/m$^2$ with a proportion by volume of fibers of 60% and a proportion by volume of matrix of 40%.

Lamination to give the Textile:

These semifinished products can be laid down to give, for example, 4-layer laminates. The layer structure is preferably symmetrical with fiber orientations of 90°/0°/0°/90° (known as a cross ply). These laminates are consolidated in a vacuum bag at 100 mbar and 110° C. for 10 minutes to give a composite. In this process, the matrix is activated for curing. This textile displays a mass loading of about 60 g/m$^2$.

Tests:

Customary tests for this type of textiles are:

(1) tear propagation test (known as a "trouser test") using a method based on DIN EN ISO 13937-2 and (2) T-peel test using a method based on DIN EN ISO 11339. Testing is carried out 24 hours after production of the specimens, with the specimens having been stored at 20° C. and a relative atmospheric humidity of 65%.

(1) Tear propagation test:
  Cuts are made for a distance of 75 mm longitudinally along the middle line of test specimens of 150 mm×50 mm. In a universal testing machine, these test specimens are pulled apart at a test speed of 10 mm/min. The above-described textile fails by delamination at a maximum force of 146 (+/−10) N (number of specimens=3).

(2) T-peel test:
  Test specimens having a length of about 150 mm and a width of 20 mm are cut to size. The initial crack is located between the two layers having a 0° fiber orientation. In a universal testing machine, these test specimens are peeled further apart at a test speed of 50 mm/min. The above-described textile displays T-peel force values of 1.7 (+/−0.6) N/mm (number of specimens=5).

As reference, a comparable textile was produced using a dispersion composition as per the introductory section of this example 1 but without addition of the deactivated solid isocyanate. The tear propagation test under the conditions set forth in section (1) above gives a maximum force of 81 (+/−4) N (number of specimens=3). The T-peel force under the conditions set forth in section (2) above is 1.0 (+/−0.4) N/mm (number of specimens=5).

EXAMPLE 2

Composition of the Dispersion:
The anionic, aqueous polyurethane dispersion Dispercoll® U XP 2702 (from Covestro AG) is formulated with a water-dispersed blocked isocyanate, Trixene Aqua B 201 (a (dimethylpyra-zole-)blocked hexamethylene 1,6-diisocyanate trimer from Lanxess) to give a latently reactive system.

Fiber Impregnation to give the Sheet-Like Semifinished Product:
Unidirectional carbon fiber tapes (mass per unit area 50 g/m$^2$, from TK-Industries) are impregnated by means of this dispersion using a doctor blade. One layer of this sheet-like semifinished product has, after drying, a mass loading of about 85 g/m$^2$ with a proportion by volume of fibers of 50% and a proportion by volume of matrix of 50%.

Lamination to give the Textile:
These semifinished products can be laid down to give, for example, 4-layer laminates. The layer structure is preferably symmetrical with fiber orientations of 90°/0°/0°/90° (known as a cross ply). These laminates are consolidated in a vacuum bag at 100 mbar and 160° C. for 30 minutes to give a composite. In this process, the matrix is activated for curing. This textile displays a mass loading of about 340 g/m$^2$.

Tests:
Testing is carried out 24 hours after production of the specimens, with the specimens having been stored at 20° C. and a relative atmospheric humidity of 65%. The tear propagation test and the T-peel test are carried out under the conditions indicated in example 1.

(1) Tear propagation test:
  The textile of example 2 fails by delamination at a maximum force of 52 (+/−2) N (number of specimens=3).

(2) T-peel test:
  The textile of example 2 displays T-peel force values of 2.7 (+/−0.7) N/mm (number of specimens=5).

For comparison, a textile was produced using a dispersion composition as per the introductory section of this example 2 but without addition of the blocked isocyanate. The tear propagation test under the conditions set forth in section (1) above gives a maximum force of 41 (+/−2) N (number of specimens=3). The T-peel force under the conditions set forth in section (2) above is 1.6 (+/−0.2) N/mm (number of specimens=5).

The invention claimed is:

1. A sheet-like semifinished product comprising:
  a matrix comprising at least one latently reactive polymer composition comprising polyurethane and a latently reactive isocyanate, which polymer composition is an aqueous dispersion and can be cured to give an elastomer; and
  continuous fibers embedded in the matrix.

2. The sheet-like semifinished product according to claim 1, wherein the fibers are based on protein, cellulose, synthetic polymers or inorganic substances.

3. The sheet-like semifinished product according to claim 1, wherein the fibers are arranged substantially in a longitudinal extension to a main area of the semifinished product.

4. The sheet-like semifinished product according to claim 1, wherein the fibers are spread.

5. A process for producing sheet-like semifinished products comprising a matrix comprising the step of:
  embedding of continuous fibers in the matrix comprising at least one latently reactive polymer composition comprising polyurethane and a latently reactive isocyanate, which polymer composition is an aqueous dispersion and can be cured to give an elastomer.

6. The process according to claim 5, wherein the latently reactive polymer composition is cured at a temperature in a range from 60 to 180° C.

7. The process according to claim 5, wherein the fibers are based on protein, cellulose, synthetic polymers or inorganic substances.

8. The process according to claim 5, wherein the fibers are arranged in a longitudinal extension to a main area of the sheet-like semifinished product.

9. The process according to claim 5, wherein the fibers are spread.

10. A sheet-like semifinished product according to claim 1, wherein the latently reactive isocyanate is encapsulated, surface-deactivated or blocked.

11. A sheet-like semifinished product according to claim 1, wherein the polymer composition can be cured to give a thermoplastic elastomer.

12. A sheet-like semifinished product according to claim 1, wherein the continuous fibers embedded in the matrix are oriented unidirectionally.

13. The process according to claim 5, wherein the at least one latently reactive polymer composition is cured to give a thermoplastic elastomer.

14. The process according to claim 5, wherein the latently reactive polymer composition is cured at a temperature in a range from 100 to 140° C.

* * * * *